United States Patent
Shroff

(10) Patent No.: US 9,544,503 B2
(45) Date of Patent: Jan. 10, 2017

(54) EXPOSURE CONTROL METHODS AND APPARATUS

(71) Applicant: THE LIGHTCO INC., Palo Alto, CA (US)

(72) Inventor: Sapna A. Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 30 days.

(21) Appl. No.: 14/627,983

(22) Filed: Feb. 20, 2015

(65) Prior Publication Data
US 2016/0191776 A1    Jun. 30, 2016

Related U.S. Application Data

(60) Provisional application No. 62/098,311, filed on Dec. 30, 2014.

(51) Int. Cl.
*H04N 5/235* (2006.01)
*H04N 5/232* (2006.01)

(52) U.S. Cl.
CPC .......... *H04N 5/2353* (2013.01); *H04N 5/2355* (2013.01); *H04N 5/23216* (2013.01)

(58) Field of Classification Search
CPC  H04N 5/2353; H04N 5/2355; H04N 5/23216; H04N 13/0022; H04N 13/0271; H04N 13/0495; H04N 2013/0081; G06T 7/0075; G06F 3/048
(Continued)

(56) References Cited

U.S. PATENT DOCUMENTS 4,890,133 A    12/1989   Ogawa et al.
5,078,479 A    1/1992    Vuilleumier
(Continued)

FOREIGN PATENT DOCUMENTS

EP    2642757 A2    9/2013
JP    10091765      4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Pritham Prabhakher
(74) *Attorney, Agent, or Firm* — Michael P. Straub; Stephen T. Straub; Ronald P. Straub

(57) ABSTRACT

Methods and apparatus for controlling exposure in a camera device are described. A depth map is used in combination with user selection of a portion of scene as part of an exposure control operation. Exposure control is based on portions of the scene, e.g., in a local window surrounding the user selected point, at the same depth as the user selected portion of the scene with other portions of the scene being excluded from consideration when controlling exposure or being given less weight than the portion or portions at the same depth as the user selected scene portion. Color maybe and in some embodiments is used in combination with depth information to identify an object of interest identified by the user selection. The identified object is then used in some embodiments in making exposure control determinations with portions of a scene outside the object being ignored or given less weight in determining an exposure to be used than the portions corresponding to the identified object.

20 Claims, 11 Drawing Sheets

(58) Field of Classification Search
USPC .......................................................... 348/362
See application file for complete search history.

(56) References Cited

U.S. PATENT DOCUMENTS

| | | |
|---|---|---|
| 5,153,569 A | 10/1992 | Kawamura et al. |
| 5,353,068 A | 10/1994 | Moriwake |
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 * | 12/2013 | Ciurea ............... H04N 13/0242 345/427 |
| 8,639,296 B2 | 1/2014 | Ahn et al. |
| 8,665,341 B2 * | 3/2014 | Georgiev ............ H04N 5/2254 348/222.1 |
| 8,704,944 B1 | 4/2014 | Wierzoch et al. |
| 8,762,895 B2 | 6/2014 | Mehta et al. |
| 8,780,258 B2 | 7/2014 | Lee |
| 8,896,655 B2 * | 11/2014 | Mauchly ............ H04N 5/23238 348/14.06 |
| 9,041,826 B2 * | 5/2015 | Jung .................. H04N 1/00251 348/220.1 |
| 9,104,705 B2 | 8/2015 | Fujinaga |
| 9,135,732 B2 | 9/2015 | Winn et al. |
| 2002/0149691 A1 | 10/2002 | Pereira et al. |
| 2003/0018427 A1 | 1/2003 | Yokota et al. |
| 2003/0020814 A1 | 1/2003 | Ono |
| 2003/0185551 A1 | 10/2003 | Chen |
| 2004/0100479 A1 | 5/2004 | Nakano et al. |
| 2004/0227839 A1 | 11/2004 | Stavely et al. |
| 2005/0088546 A1 | 4/2005 | Wang |
| 2005/0200012 A1 | 9/2005 | Kinsman |
| 2006/0067672 A1 | 3/2006 | Washisu et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1 | 9/2011 | Gwak |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0207462 A1 | 8/2012 | Justice |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2014/0049677 A1 | 2/2014 | Kawaguchi |
| 2014/0063018 A1 * | 3/2014 | Takeshita ............ G06T 7/0051 345/427 |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 * | 8/2014 | Eguchi ............... H04N 5/23229 348/239 |
| 2014/0267243 A1 * | 9/2014 | Venkataraman ...... G06T 7/0065 345/419 |
| 2014/0293079 A1 | 10/2014 | Milanfar et al. |
| 2014/0354714 A1 | 12/2014 | Hirschler et al. |

(56) References Cited

U.S. PATENT DOCUMENTS

| | | | |
|---|---|---|---|
| 2015/0035824 A1* | 2/2015 | Takahashi | H04N 13/0271 345/419 |
| 2015/0043808 A1* | 2/2015 | Takahashi | H04N 13/0022 382/154 |
| 2015/0049233 A1 | 2/2015 | Choi | |
| 2015/0154449 A1* | 6/2015 | Ito | G06K 9/00375 382/103 |
| 2015/0156399 A1 | 6/2015 | Chen et al. | |
| 2015/0234149 A1 | 8/2015 | Kreitzer et al. | |
| 2015/0253647 A1 | 9/2015 | Mercado | |
| 2015/0279012 A1 | 10/2015 | Brown et al. | |
| 2016/0142610 A1* | 5/2016 | Rivard | H04N 5/2356 348/239 |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Robertson, M et al "Dynamic Range Improvement Through Multiple Exposures". 1999. [online] [retrieved on Apr. 16, 2014]<URL:http://ieeexplore.ieee.org/xpl/login.jsp?tp=&arnumber=817091&url=http%3A%2F%2Fieeexplore.ieee.org%2Fxpls%2Fabs_all.jsp%03Farnumber%3D817091>, pp. 1-6.

International Search Report from International Application No. PCT/US14/10267, pp. 1-5, dated Jul. 8, 2014.

Written Opinion of the International Searching Authority from International Application No. PCT/US14/10267, pp. 1-29, dated Jul. 8, 2014.

International Search Report and Written Opinion of the International Searching Authority from International Application No. PCT/US2014/061254, pp. 1-29, dated Jan. 8, 2015.

International Search Report and Written Opinion of the International Searching Authority from International Application No. PCT/US2014/061248, pp. 1-11, dated Jan. 13, 2015.

International Search Report and Written Opinion of the International Searching Authority from International Application No. PCT/US2014/061258, pp. 1-14, dated Jan. 13, 2015.

International Search Report and Written Opinion of the International Searching Authority from International Application No. PCT/US2014/061257, pp. 1-12, dated Jan. 14, 2015.

International Search Report and Written Opinion of the International Searching Authority from International Application No. PCT/US2014/062306, pp. 1-12, dated Jan. 26, 2015.

International Search Report and Written Opinion of the International Searching Authority from International Application No. PCT/US2014/063601, pp. 1-12, dated Jan. 27, 2015.

International Search Report and Written Opinion of the International Searching Authority from International Application No. PCT/US2014/072907, pp. 1-11, dated Mar. 27, 2015.

* cited by examiner

| FIGURE 7A | FIGURE 7B |

EXPOSURE CONTROL METHODS AND APPARATUS

RELATED APPLICATIONS

The present application claims the benefit of U.S. Provisional Patent Application Ser. No. 62/098,311 filed Dec. 30, 2014 which is hereby expressly incorporated by reference in its entirety.

FIELD

The present application relates to exposure control and more particularly, to methods and/or apparatus for controlling exposure in a camera device.

BACKGROUND

Exposure control is intended to address the fact that a photographic sensor has a physically limited useful exposure range often called its dynamic range. If, for any part of the photograph, the actual exposure is outside this range, the sensor will not capture the image accurately. For example bright scene areas which saturate the corresponding pixels (picture elements) of a sensor would be overexposed and will normally appear as bright spots, e.g., white areas in the case of black and white images.

In an attempt to ensure that an area of interest, e.g., subject, in a scene is captured accurately, automatic exposure control in digital cameras is sometimes based on user selection of a point of a displayed image to indicate a subject of interest. In such systems, the area around and including the selected point, e.g., a rectangular area, is then normally used as the basis for automated exposure control with all portions within the rectangular area being treated as being of equal importance for exposure control purposes. While this approach is satisfactory in many applications, it can have undesirable results where the subject occupies only a portion of the scene area around the selected point that is used for exposure control.

For example, consider the case where a thin portion, e.g., branch, of a tree is selected by a user of the camera as the subject of interest. A large portion of the area surrounding the branch selected as the subject of interest may correspond to the sky or some other distant object of little interest to the user. It should be appreciated that treating light corresponding to the sky or distant object for purposes of determining exposure control may result in an exposure which does not primarily reflect the light from the subject of interest, the tree branch, but rather the distant object. This can result in under and/or over exposure with respect to the actual identified subject of interest, e.g., the tree branch which emits much less light than the bright sky and is also at a very different distance from the camera than the sky or background adjacent the tree branch.

In view of the above discussion, it should be appreciated that there is a need for improved methods and/or apparatus for implementing exposure control. In view of the above discussion it should be appreciated that there is a need for exposure control methods which could take into consideration one or more factors other than simple proximity to a point identified as a subject of interest when making an exposure control determination.

SUMMARY OF THE INVENTION

Exposure control related methods and apparatus are described. The methods and apparatus are particularly well suited for implementing automated exposure control in a camera device. In various embodiments, a user identifies a portion of a scene of interest, e.g., the subject of a image to be taken, by tapping on a screen to identify the subject of interest. Depth information is used in combination with the identification of the subject of interest when making an exposure control determination. For example, in some embodiments, a depth map of a scene area is generated and then used to identify portions of the scene at the same depth or close to the identified depth of the user identified scene portion. Such portions of the scene may then be given priority over portions at other depths, e.g., distances, from the camera when making an automated exposure control determination.

By using depth information in combination with user information identifying a subject, the exposure control can be optimized to capture objects at the same or similar depth to the identified subject. In such an implementation, even if the user identifies a portion of a scene close to a background portion, thanks to the use of depth information, exposure control will be based with scene portions at the same or similar depth as the subject of interest being given greater weight in determining the exposure to be used than other portions of the scene.

In some but not necessarily all embodiments, only scene portions at or close to the same depth as the identified subject of interest are used for exposure control. In other embodiments, light from an area around and including an identified subject of interest is used to control exposure but with light from portions of the scene at or near the same depth as the user identified subject being given greater priority than other portions of the scene area being used. Thus, pixel elements corresponding to scene portions at the same or similar depth of an identified subject are less likely than other portions to become saturated given that the exposure is controlled to accurately capture such scene portions.

The exposure control techniques described herein can provide for more reliable exposure control with respect to capturing an image of an identified subject of interest than methods which do not use depth information for exposure control purposes.

An exemplary method of controlling a camera, in accordance with some embodiments, includes; receiving user input identifying a portion of a scene to be used in controlling image capture; and performing an exposure control operation based on the user selected portion of the scene and a depth map. An exemplary camera device, in accordance with some embodiments, comprises: a touch sensitive screen for receiving user input identifying a portion of a scene to be used in controlling image capture; and an exposure control module for performing an exposure control operation based on the user selected portion of the scene and a depth map. An exemplary camera device, in accordance with some embodiments, comprises: a user input for receiving user input identifying a portion of a scene to be used in controlling image capture; and a processor configured to perform an exposure control operation based on the user selected portion of the scene and a depth map. A non-transitory computer readable medium, in accordance with some embodiments, comprises processor executable instructions which, when executed by a processor of a camera device control the camera device to: detect receipt of user input identifying a portion of a scene to be used in controlling image capture; and automatically control the camera device to perform an exposure control operation based on the user selected portion of the scene and a depth map.

Numerous additional benefits and embodiments are discussed in the detailed description which follows.

DETAILED DESCRIPTION

Figure 1A:
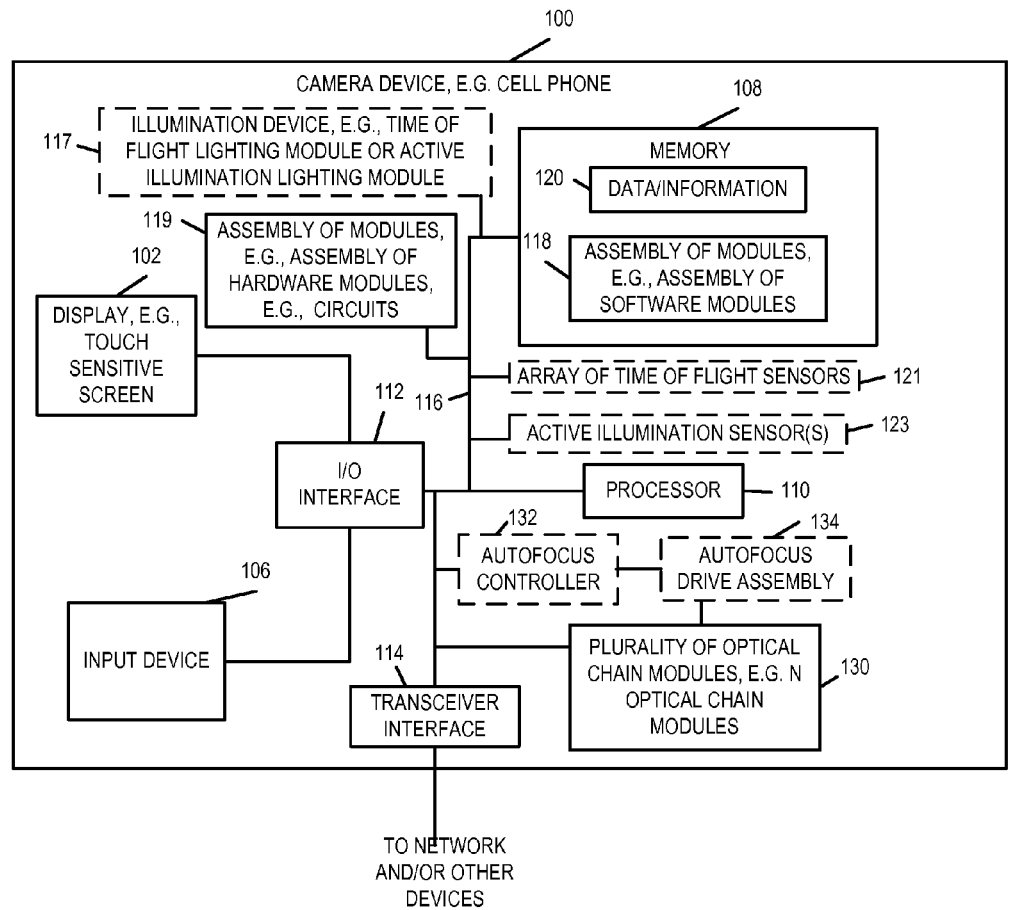
FIG. 1A is an exemplary block diagram of an exemplary apparatus, e.g., camera device, implemented in accordance with one embodiment of the present invention.

FIG. 1A illustrates an exemplary apparatus 100, sometimes referred to hereinafter as a camera device, implemented in accordance with one exemplary embodiment of the present invention. The camera device 100, in some embodiments, is a portable device, e.g., a cell phone or tablet including a camera assembly. In other embodiments, it is fixed device such as a wall mounted camera.

FIG. 1A illustrates the camera device 100 in block diagram form showing the connections between various elements of the apparatus 100. The exemplary camera device 100 includes a display device 102, an input device 106, memory 108, a processor 110, a transceiver interface 114, e.g., a cellular interface, a WIFI interface, or a USB interface, an I/O interface 112, and a bus 116 which are mounted in a housing represented by the rectangular box touched by the line leading to reference number 100. The input device 106 may be, and in some embodiments is, e.g., keypad, touch screen, or similar device that may be used for inputting information, data and/or instructions. The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The I/O interface 112 couples the display 102 and input device 106 to the bus 116 and interfaces between the display 102, input device 106 and the other elements of the camera which can communicate and interact via the bus 116. In addition to being coupled to the I/O interface 112, the bus 116 is coupled to the memory 108, processor 110, an optional autofocus controller 132, a transceiver interface 114, and a plurality of optical chain modules 130, e.g., N optical chain modules. In some embodiments N is an integer greater than 2, e.g., 3, 4, 7 or a larger value depending on the particular embodiment. Images captured by individual optical chain modules in the plurality of optical chain modules 130 can be stored in memory 108, e.g., as part of the data/information 120 and processed by the processor 110, e.g., to generate one or more composite images. Multiple captured images and/or composite images may be processed to form video, e.g., a series of images corresponding to a period of time. Transceiver interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The transceiver interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The transceiver interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in the optical chain modules used to achieve a desired, e.g., user indicated, focus. In the case where individual drive assemblies are included in each optical chain module, the autofocus controller 132 may drive the autofocus drive of various optical chain modules to focus on the same target. As will be discussed further below, in some embodiments lenses for multiple optical chain modules are mounted on a single platter which may be moved allowing all the lenses on the platter to be moved by adjusting the position of the lens platter. In some such embodiments the autofocus drive assembly 134 is included as an element that is external to the individual optical chain modules with the drive assembly 134 driving the platter including the lenses for multiple optical chains under control of the autofocus controller 132. While the optical chain modules will in many embodiments be focused together to focus on an object at a particular distance from the camera device 100, it is possible for different optical chain modules to be focused to different distances and in some embodiments different focus points are intentionally used for different optical chains to increase the post processing options which are available.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

In some embodiments, the camera device 100 includes an illumination device 117, e.g., a time of flight lighting module or an active illumination lighting module. In some such embodiments, camera device 100 further includes one or both of i) an array of time of flight sensors 121 and ii) one or more active illumination sensors 123. In some embodiments, sensors 121 and/or 123 are included in the plurality of optical chain modules 130.

Having described the general components of the camera device 100 with reference to FIG. 1A, various features relating to the plurality of optical chain modules 130 will now be discussed with reference to FIGS. 1B and 1C which show the camera device 100 from front and side perspectives, respectively. Dashed line 101 of FIG. 1 B indicates a cross section line corresponding to the FIG. 1C view.

Box 117 represents a key and indicates that OCM=optical chain module and each L1 represents an outermost lens in an optical chain module. Box 119 represents a key and indicates that S=sensor, F=filter, L=lens, L1 represents an outermost lens in an optical chain module, and L2 represents an inner lens in an optical chain module.

Figure 1B:
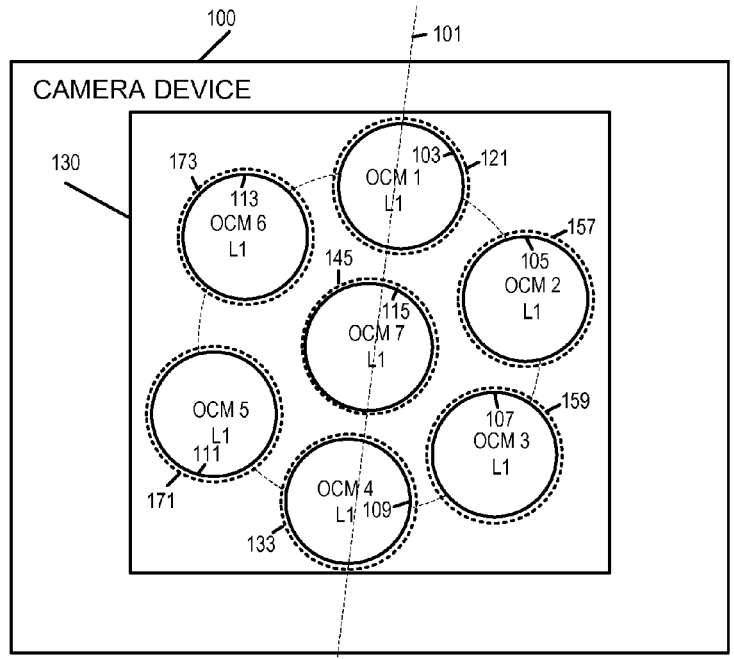
FIG. 1B illustrates a frontal view of an apparatus implemented in accordance with an exemplary embodiment of the present invention which incorporates multiple optical chain modules in accordance with the present invention with lenses which are viewable from the front of the camera.

FIG. 1B shows the front of the camera device 100. Rays of light 131, which is light toward the front of the camera assembly, shown in FIG. 1C may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chain modules 130 is mounted.

Figure 1C:
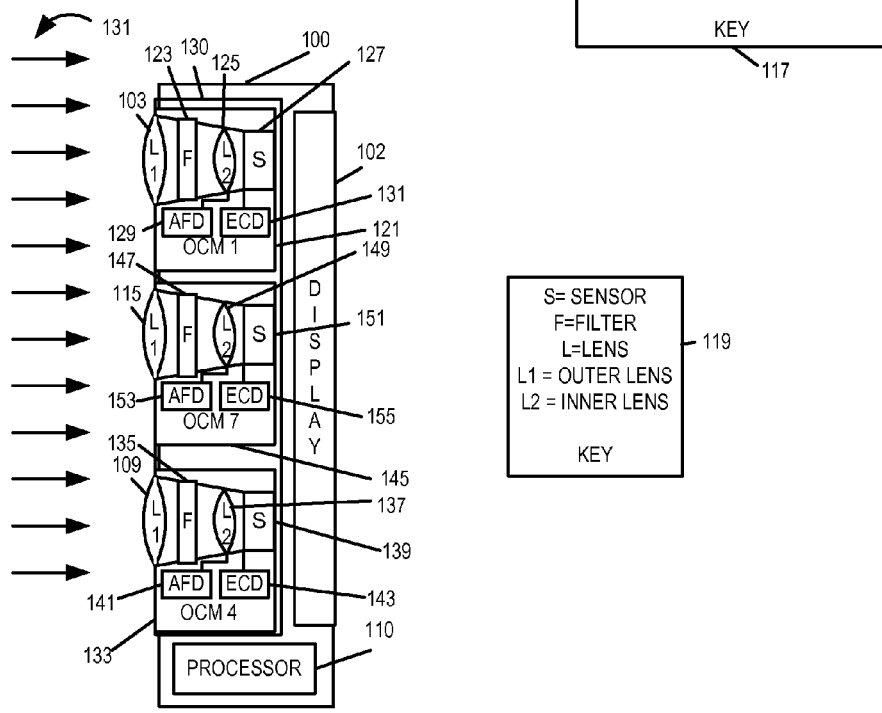
FIG. 1C, which is a side view of the exemplary apparatus of FIG. 1B, illustrates further details of the exemplary apparatus.

FIG. 1C, which shows a side perspective of camera device 100, illustrates three of the seven optical chain modules (OCM 1 121, OCM 7 145, OCM 4 133) of the set of optical chain modules 130, display 102 and processor 110. OCM 1 121 includes an outer lens L1 103, a filter 123, an inner lens L2 125, and a sensor 127. OCM 1 121 further includes autofocus drive (AFD) 129 for controlling the position of lens L2 125, and exposure control device (ECD) 131 for controlling sensor 127. The AFD 129 includes a motor or other drive mechanism which can move the lens (or sensor) to which it is connected. While the AFD 129 is shown coupled, e.g., connected, to the lens L2 125 and thus can move the position of the lens L2 as part of a focus operation, in other embodiments the AFD 129 is coupled to the sensor 127 and moves the position of the sensor 127, e.g., to change the distance between the sensor 127 and the lens 125 as part of a focus operation. OCM 7 145 includes an outer lens L1 115, a filter 147, an inner lens L2 149, and a sensor 151. OCM 7 145 further includes AFD 153 for controlling the position of lens L2 149 and ECD 155 for controlling sensor 151.

OCM 4 133 includes an outer lens L1 109, a filter 135, an inner lens L2 137, and a sensor 139. The AFD 153 includes a motor or other drive mechanism which can move the lens (or sensor) to which it is connected. While the AFD 153 is shown coupled, e.g., connected, to the lens L2 149 and thus can move the position of the lens L2 as part of a focus operation, in other embodiments the AFD 149 is coupled to the sensor 151 and moves the position of the sensor 151, e.g., to change the distance between the sensor 151 and the lens 149 as part of a focus operation.

OCM 4 133 further includes AFD 141 for controlling the position of lens L2 137 and ECD 143 for controlling sensor 139. The AFD 141 includes a motor or other drive mechanism which can move the lens (or sensor) to which it is connected. While the AFD 141 is shown coupled, e.g., connected, to the lens L2 137 and thus can move the position of the lens L2 as part of a focus operation, in other embodiments the AFD 141 is coupled to the sensor 139 and moves the position of the sensor 139, e.g., to change the distance between the sensor 139 and the lens 137 as part of a focus operation.

While only three of the OCMs are shown in FIG. 1C it should be appreciated that the other OCMS of the camera device 100 may, and in some embodiments do, have the same or similar structure.

FIG. 1C and the optical chain modules (OCMs), also sometimes referred to as optical camera modules, illustrated therein are illustrative of the general structure of OCMs used in various embodiments. However, as will be discussed in detail below, numerous modifications and particular configurations are possible. Many of the particular configurations will be discussed below with use of reference to the optical camera modules shown in FIG. 1C. While reference to elements of FIG. 1C may be made, it is to be understood that the OCMs in a particular embodiment will be configured as described with regard to the particular embodiment. Thus, for example, the filter may be of a particular color. Similarly, in embodiments where the filter is expressly omitted and described as being omitted or an element which allows all light to pass, while reference may be made to the OCMs of FIG. 1C, it should be appreciated that the filter will be omitted in an embodiment where it is indicated to be omitted or of such a nature that it passes a broad spectrum of light to pass if the embodiment is indicated to have a broadband filter. As will be discussed below, the elements of the different OCMs may, but need not be, mounted on a common support device, e.g., disc or platter, allowing a set of filters, lenses or sensors of the different optical chains to be moved as a set. While in the OCMs of FIG. 1C mirrors are not shown, as will be discussed below, in at least some embodiments one or more mirrors are added to the OCMs to all light to be directed, e.g., to increase the length of the optical path or make for a more convenient internal component configuration. It should be appreciated that each of the OCMS 121, 145, 133, shown in FIG. 1C will have their own optical axis which corresponds to the path light entering the particular OCM will follow as it passes from the lens 103, 115, or 109 at the front of the optical chain and passes through the OCM to the corresponding sensor 127, 151, 139.

While the processor 110 is not shown being coupled to the AFD, ECD and sensors 127, 151, 139 it is to be appreciated that such connections exist and are omitted from FIG. 1C to facilitate the illustration of the configuration of the exemplary OCMs.

As should be appreciated the number and arrangement of lens, filters and/or mirrors can vary depending on the particular embodiment and the arrangement shown in FIG. 1C is intended to be exemplary and to facilitate an understanding of the invention rather than limiting in nature.

The front of the plurality of optical chain modules 130 is visible in FIG. 1B with the outermost lens of each optical chain module appearing as a circle represented by a solid line (OCM 1 L1 103, OCM 2 L1 105, OCM 3 L1 107, OCM 4 L1 109, OCM 5 L1 111, OCM 6 L1 113, OCM 7 L1 115). In the FIG. 1B example, the plurality of optical chain modules 130 include seven optical chain modules, OCM 1 121, OCM 2 157, OCM 3 159, OCM 4 133, OCM 5 171, OCM 6 173, OCM 7 145, which include lenses (OCM 1 L1 103, OCM 2 L1 105, OCM 3 L1 107, OCM 4 L1 109, OCM 5 L1 111, OCM 6 L1 113, OCM 7 L1 115), respectively, represented by the solid circles shown in FIG. 1B. The lenses of the optical chain modules are arranged to form a pattern which is generally circular in the FIG. 1B example when viewed as a unit from the front. While a circular arrangement is preferred in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

Note that the individual outer lenses, in combination, occupy an area that might otherwise have been occupied by a single large lens. Thus, the overall total light capture area corresponding to the multiple lenses of the plurality of chain modules OCM 1 to OCM 7, also sometimes referred to as optical camera modules, approximates that of a lens having a much larger opening but without requiring a single lens having the thickness which would normally be necessitated by the curvature of a single lens occupying the area which the lenses shown in FIG. 1B occupy.

While gaps are shown between the lens openings of the optical chain modules OCM 1 to OCM 7, it should be appreciated that the lenses may be made, and in some embodiments are, made so that they closely fit together minimizing gaps between the lenses represented by the circles formed by solid lines. While seven optical chain modules are shown in FIG. 1B, it should be appreciated that other numbers of optical chain modules are possible.

As will be discussed below, the use of seven optical chain modules provides a wide degree of flexibility in terms of the types of filter combinations and exposure times that can be used for different colors while still providing an optical camera module that can be used to provide an image for purposes of user preview of the image area and selection of a desired focal distance, e.g., by selecting an object in the preview image which is to be the object where the camera modules are to be focused.

For example, in some embodiments, at least some of the different optical chain modules include filters corresponding to a single color thereby allowing capture of a single color at the full resolution of the image sensor, e.g., the sensor does not include a Bayer filter. In one embodiment two optical chain modules are dedicated to capturing red light, two optical chain modules are dedicated to capturing green light and two optical chain modules are dedicated to capturing blue light. The center optical chain module may include a RGB filter or opening which passes all colors with different portions of the sensor of the center optical chain module being covered by different color filters, e.g., a Bayer pattern with the optical chain module being used to capture all three colors making it easy to generate color preview images without having to process the output of multiple optical chain modules to generate a preview image.

The use of multiple optical chains such as shown in the FIG. 1A-1C embodiment has several advantages over the use of a single optical chain.

Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

As should be appreciated, different wavelengths of light will be bent by different amounts by the same lens. This is because the refractive index of glass (or plastic) which the lens is made of changes with wavelength. Dedication of individual optical chains to a particular color allows for the lenses for those optical chains to be designed taking into consideration the refractive index of the specific range of wavelength for that color of light. This can reduce chromatic aberration and simplify lens design. Having multiple optical chains per color also has the advantage of allowing for different exposure times for different optical chains corresponding to a different color. Thus, as will be discussed further below, a greater dynamic range in terms of light intensity can be covered by having different optical chains use different exposure times and then combining the result to form the composite image, e.g., by weighting the pixel values output by the sensors of different optical chains as a function of exposure time when combing the sensed pixel values to generate a composite pixel value for use in a composite image. Given the small size of the optical sensors (pixels) the dynamic range, in terms of light sensitivity, is limited with the sensors becoming easily saturated under bright conditions. By using multiple optical chains corresponding to different exposure times the dark areas can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 1C is a cross section perspective of the camera device 100 shown in FIGS. 1A and 1B. Dashed line 101 in FIG. 1B shows the location within the camera device to which the cross section of FIG. 1C corresponds. From the side cross section, the components of the first, seventh and fourth optical chains are visible.

As illustrated in FIG. 1C despite including multiple optical chains the camera device 100 can be implemented as a relatively thin device, e.g., a device less than 2, 3 or 4 centimeters in thickness in at least some embodiments. Thicker devices are also possible, for example devices with telephoto lenses and are within the scope of the invention, but the thinner versions are particularly well suited for cell phones and/or tablet implementations.

As illustrated in the FIG. 1C diagram, the display device 102 may be placed behind the plurality of optical chain modules 130 with the processor 110, memory and other components being positioned, at least in some embodiments, above or below the display and/or optical chain modules 130. As will be discussed below, and as shown in FIG. 1C, each of the optical chains OCM 1 121, OCM 7 145, OCM 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters.

In FIG. 1C, each optical chain module includes an auto focus drive (AFD) also sometimes referred to as an auto focus device which can alter the position of the second lens L2, e.g., move it forward or back, as part of a focus operation. An exposure control device (ECD) which controls the light exposure time of the sensor to which the ECD corresponds, is also included in each of the OCMs shown in the FIG. 1C embodiment. The AFD of each optical chain module operates under the control of the autofocus controller 132 which is responsive to user input which identifies the focus distance, e.g., by the user highlighting an object in a preview image to which the focus is to be set. The autofocus controller while shown as a separate element of the device 100 can be implemented as a module stored in memory and executed by processor 110.

Note that while supporting a relatively large light capture area and offering a large amount of flexibility in terms of color filtering and exposure time, the camera device 100 shown in FIG. 1C is relatively thin with a thickness that is much less, e.g., ⅕th, ⅒th, 1/20th or even less than the overall side to side length or even top to bottom length of the camera device visible in FIG. 1B.

Figure 2:
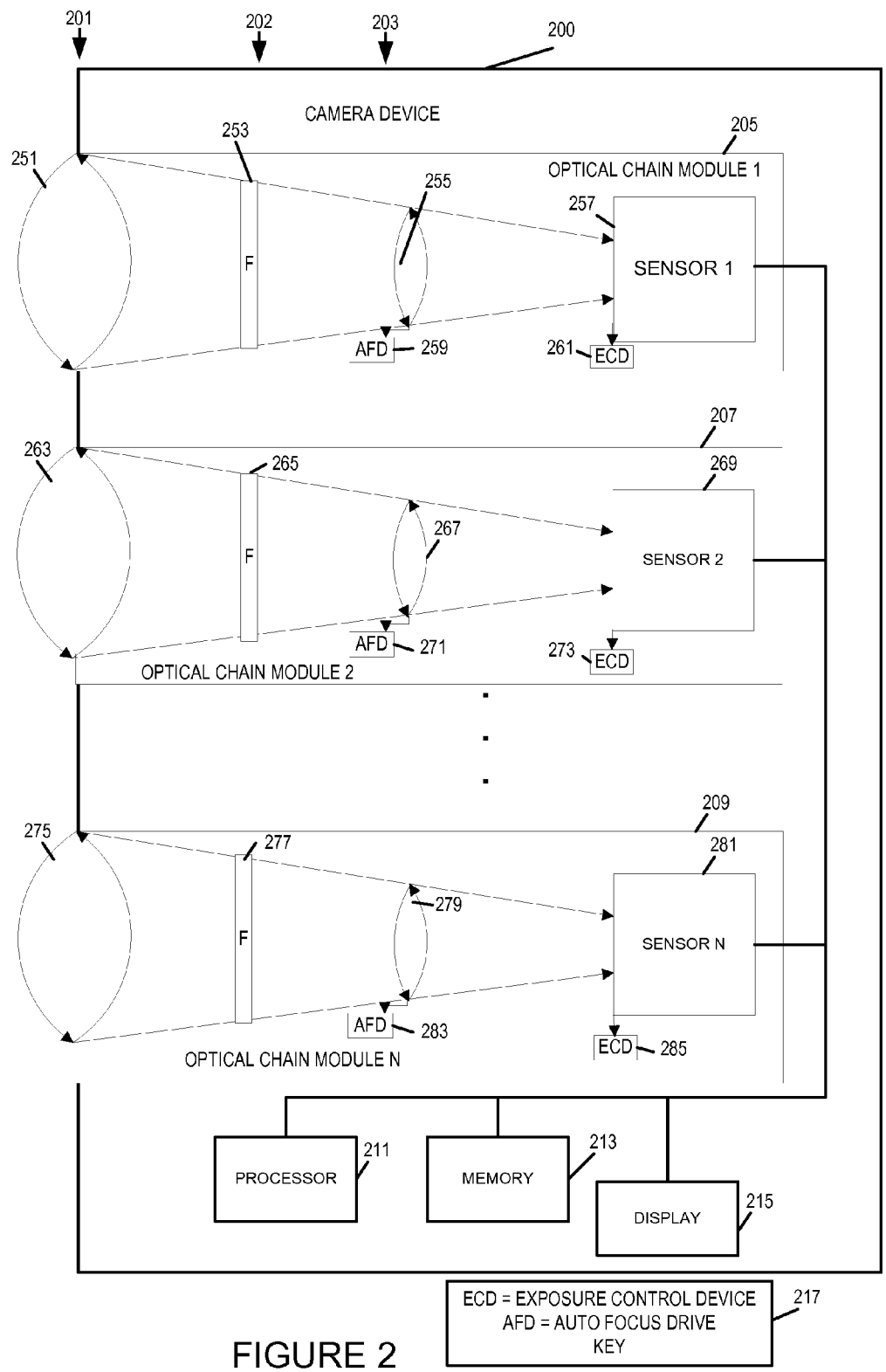
FIG. 2 illustrates a camera device implemented in accordance with one embodiment of the present invention.

FIG. 2 illustrates a camera device 200 implemented in accordance with the invention. The FIG. 2 camera device 200 includes many or all of the same elements shown in the device 100 of FIGS. 1A-1C. Exemplary camera device 200 includes a plurality of optical chain modules (OCM 1 205, OCM 2 207, . . . , OCM N 209, a processor 211, memory 213 and a display 215, coupled together. OCM 1 205 includes outer lens L1 251, filter 253, inner lens L2 255, sensor 1 257, AFD 259 and ECD 261. In some embodiments, processor 211 of camera device 200 of FIG. 2 is the same as processor 110 of device 100 of FIG. 1A, memory 213 of device 200 of FIG. 2 is the same as memory 108 of device 100 of FIG. 1A, and display 215 of device 200 of FIG. 2 is the same as display 102 of device 100 of FIG. 1A.

OCM 2 207 includes outer lens L1 263, filter 265, inner lens L2 267, sensor 2 269, AFD 271 and ECD 273. OCM N 209 includes outer lens L1 275, filter 277, inner lens L2 279, sensor N 281, AFD 283 and ECD 285. Box 217, which represents a key, indicates that ECD=exposure control device and AFD=auto focus drive.

In the FIG. 2 embodiment the optical chain modules (optical chain module 1 205, optical chain module 2 207, . . . , optical chain module N 209) are shown as independent assemblies with the autofocus drive of each module being a separate AFD element (AFD 259, AFD 271, AFD 283), respectively.

In FIG. 2, the structural relationship between the various lenses and filters which precede the sensor in each optical chain module can be seen more clearly. While three elements, e.g. two lenses (see columns 201 and 203 corresponding to L1 and L2, respectively) and the filter (corresponding to column 202) are shown in FIG. 2 before each sensor, it should be appreciated that a much larger combination of lenses and/or filters may precede the sensor of one or more optical chain modules with anywhere from 2-10 elements being common and an even larger number of elements being used in some embodiments, e.g., high end embodiments and/or embodiments supporting a large number of filter and/or lens options.

In some but not all embodiments, optical chain modules are mounted in the camera device to extend from the front of the camera device towards the back, e.g., with multiple optical chain modules being arranged in parallel. Filters and/or lenses corresponding to different optical chain modules may, and in some embodiments are, arranged in planes extending perpendicular to the front to back direction of the camera device from the bottom of the camera device towards the top of the camera device. While such a mounting arrangement is used in some embodiments, other arrangements where the optical chain modules are arranged at different angles to one another and/or the camera body are possible.

Note that the lenses/filters are arranged in planes or columns in the vertical dimension of the camera device 200 to which reference numbers 201, 202, 203 correspond. The fact that the lenses/filters are aligned along vertical planes allows for a manufacturing and structural simplification that is used in some embodiments. That is, in some embodiments, the lenses and/or filters corresponding to a plane 201, 202, 203 are formed or mounted on a platter or plate. The term platter will be used for discussion purposes but is not intended to be limiting. The platter may take the form of a disc but non-round platters are also contemplated and are well suited for some embodiments. In the case of plastic lenses, the lenses and platter may be molded out of the same material in a single molding operation greatly reducing costs as compared to the need to manufacture and mount separate lenses. As will be discussed further, platter based embodiments allow for relatively simple synchronized focus operations in that a platter may be moved front or back to focus multiple OCMs at the same time. In addition, as will be explained, platters may be moved or rotated, e.g., along a central or non-central axis, to change lenses and or filters corresponding to multiple optical chain modules in a single operation. A single platter may include a combination of lenses and/or filters allowing, e.g., a lens to be replaced with a filter, a filter to be replaced with a lens, a filter or lens to be replaced with an unobstructed opening. As should be appreciated the platter based approach to lens, filter and/or holes allows for a wide range of possible combinations and changes to be made by simple movement of one or more platters. It should also be appreciated that multiple elements may be combined and mounted together on a platter. For example, multiple lenses, filters and/or lens-filter combinations can be assembled and mounted to a platter, e.g., one assembly per optical chain module. The assemblies mounted on the platter for different optical chains may be moved together, e.g., by rotating the platter, moving the platter horizontally or vertically or by moving the platter using some combination of one or more such movements.

While platters have been described as being moved to change elements in an optical chain, they can, and in some embodiments are, moved for image stabilization purposes. For example, a platter having one or more lenses mounted thereon can be moved as part of an image stabilization operation, e.g., to compensate for camera motion.

While mounting of lenses and filters on platters has been discussed, it should also be appreciated that the sensors of multiple optical chains can be mounted on a platter. For example, sensors without color filters may be replaced with sensors with color filters, e.g., Bayer pattern filters. In such an embodiment sensors can be swapped or changed while leaving one or more components of one or more optical chains in place.

Note from a review of FIG. 2 that in some embodiments, e.g., larger focal length telephoto applications, the elements, e.g., filters/lenses closer to the sensor of the optical chain module, are smaller in size than the outer most lenses shown in column 201. As a result of the shrinking size of the lenses/filters, space becomes available between the lenses/filters within the corresponding platter.

Figure 3A:
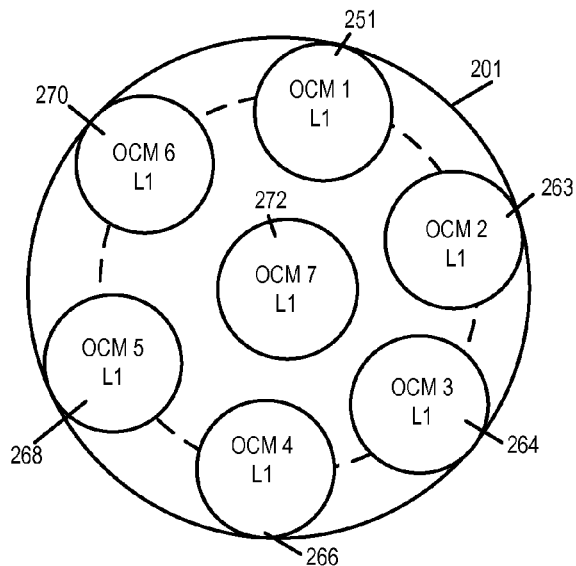
FIG. 3A shows an exemplary lens configuration which may be used for the set of outer lenses of the camera device shown in FIGS. 1A-1C.
Figure 3B:
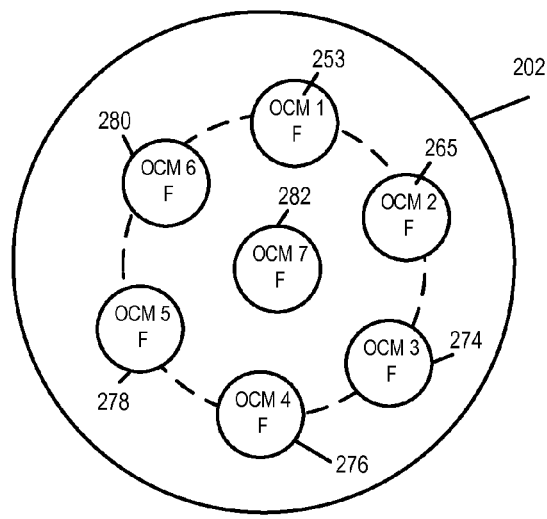
FIG. 3B illustrates an exemplary filter arrangement which is used in the camera of FIGS. 1A-1C in some embodiments.
Figure 3C:
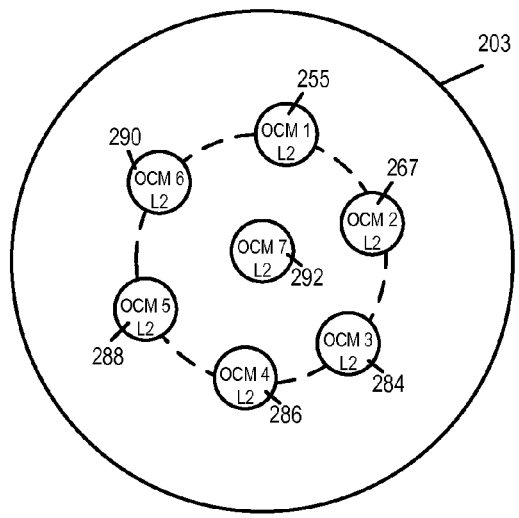
FIG. 3C shows an exemplary inner lens configuration which may, and in some embodiments is, used for a set of inner lenses of the camera device shown in FIGS. 1A-1C.

FIGS. 3A through 3C provide perspective views of the different planes 201, 202, 203 shown in FIG. 2. As shown in FIG. 3A, the outer lenses L1 (OCM 1 L1 251, OCM 2 L1 263, OCM 3 L1 264, OCM 4 L1 266, OCM 5 L1 268, OCM 6 L1 270, OCM 7 L1 272) occupy much of the outer circular area corresponding to the front of the camera modules as previously shown in FIG. 1B. However, as shown in FIG. 3B the filters (OCM 1 F 253, OCM 2 F 265, OCM 3 F 274, OCM 4 F 276, OCM 5 F 278, OCM 6 F 280, OCM 7 F 282) corresponding to plane 202 occupy less space than the lenses shown in FIG. 3A while the inner lenses L2 (OCM 1 L2 255, OCM 2 L2 267, OCM 3 L2 284, OCM 4 L2 286, OCM 5 L2 288, OCM 6 L2 290, OCM 7 L2 292) shown in FIG. 3C occupy even less space. In some embodiments, where N=7, outer lens L1 275, filter F 277, and inner lens L2 279 of FIG. 2 are the same as OCM 7 L1 272 of FIG. 3A, OCM 7 F 282 of FIG. 3B and OCM 7 L2 292 of FIG. 3C, respectively.

The decreasing size of the inner components allow multiple lenses and/or filters to be incorporated into a platter corresponding to one or more of the inner planes. Consider for example that an alternative filter F' or hole could be mounted/drilled below or next two each filter F of a platter corresponding to plan 202 and that by shifting the position or platter vertically, horizontally or a combination of horizontally and vertically, the filter F can be easily and simply replaced with another filter or hole. Similarly the lenses L2 may be replaced by alternative lenses L2' by shifting a platter of lenses corresponding to plane 203. In some embodiments, the platter may also be rotated to support changes. The rotation may be an off center rotation and/or may be performed in combination with one or more other platter position changes.

Figure 4:
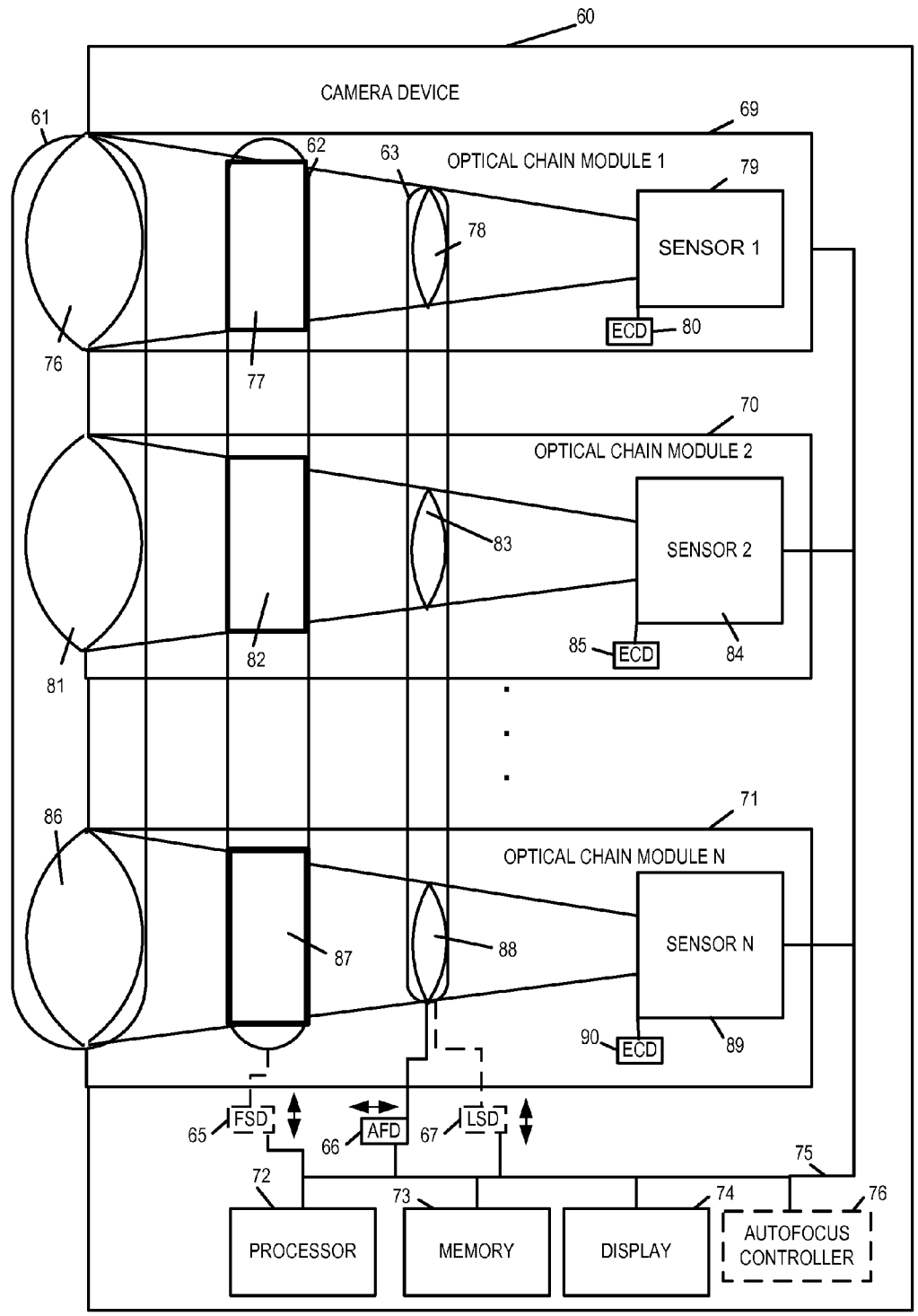
FIG. 4 illustrates an exemplary camera device in which the sets of outer lenses, filters, and inner lenses are mounted on corresponding platters.

A camera device 60 which includes platters of lenses and/or filters (61, 62, 63) is shown in FIG. 4. Camera device 60 includes a plurality of optical chain modules (optical chain module 1 69, optical chain module 2 70, . . . , optical chain module N 71), processor 72, memory 73, and display 74 coupled together via bus 75. Optical chain module 1 69 includes sensor 1 79 and ECD 80; optical chain module 2 70 includes sensor 2 84 and ECD 85; and optical chain module N 71 includes sensor N 89 and ECD 90. In some embodiments, processor 72, memory 73, display 74, and autofocus controller 76 of device 60 of FIG. 4 are the same as processor 110, memory 108, display 102, and autofocus controller 132 of device 100 of FIG. 1A.

Element 61 represents a platter of outer lenses L1 with 3 of the lenses (76, 81, 86) being shown as in the FIG. 1C example. Additional lenses may be, and often are, included on the platter 61 in addition to the ones shown. For example, in a seven optical chain module embodiment such as shown in FIG. 1, platter 61 would include seven outer lenses. Note that the thickness of the platter 61 need not exceed the maximum thicknesses of the lenses and from a side perspective is much thinner than if a single lens having a similar curvature to that of the individual lenses L1, but with the single lens being larger, occupied the same area as all the 7 lenses on the platter 61. Platter 62 includes the filters F, which include the three filters (77, 82, 87) while platter 63 includes the inner lenses L2, which include the three lenses (78, 83, 88). As can be appreciated the camera device 60 is the same as or similar to the camera device of FIG. 1C and FIG. 2 but with the lenses and filters being mounted on platters which may be moved between the front and back of the camera to support autofocus or horizontally and/or vertically to support lens/filter changes.

Auto focus drive 66 is used to move platter 63 forward or backward as part of a focus operation, e.g., under control of the autofocus controller 76 which may be, and often is, included in the camera device 60. A filter shift drive (FSD) 65 is included in embodiments where shifting of the platter 62 is supported as part of a filter change operation. The FSD 65 is responsive to the processor 72 which operates in response to user selection of a particular mode of operation and/or an automatically selected mode of operation and can move the platter 62 vertically, horizontally or in some combination of vertical and horizontal motion to implement a filter change operation. The FSD 62 may be implemented with a motor and mechanical linkage to the platter 62. In some embodiments, the platter 62 may also be rotated to support changes. The rotation may be an off center rotation and/or may be performed in combination with one or more other platter position changes.

A lens shift drive (LSD) 67 is included in embodiments where shifting of the platter 63 is supported as part of a filter change operation. The LSD 67 is responsive to the processor 72 which operates in response to user selection of a particular mode of operation and/or an automatically selected mode of operation and can move the platter 63 vertically, horizontally or in some combination of vertical and horizontal motion to implement a lens change operation. The LSD 67 may be implemented with a motor and mechanical linkage to the platter 63. In some embodiments, the platter 63 may also be rotated to support changes. The rotation may be an off center rotation and/or may be performed in combination with one or more other platter position changes.

Figure 5:
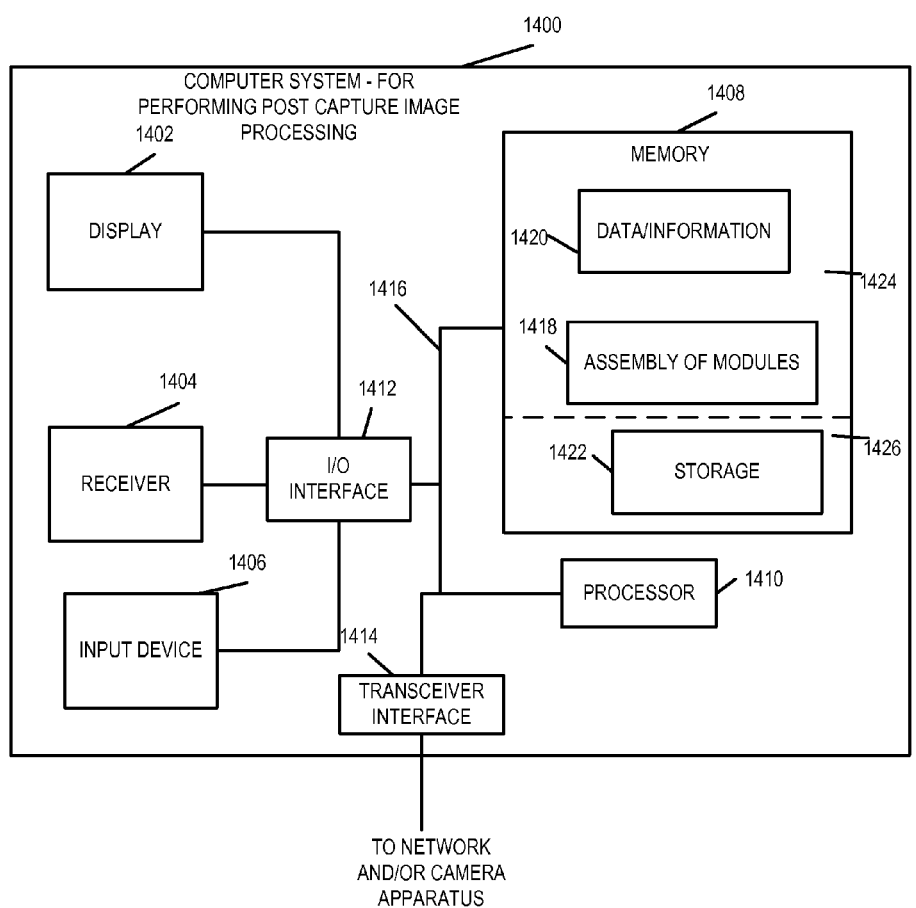
FIG. 5 illustrates a computer system which can be used for post processing of images captured using a camera device.

FIG. 5 illustrates a computer system which can be used for post processing of images captured using a camera device. The computer system 1400 includes a display 1402, Input/Output (I/O) interface 1412, receiver 1404, input device 1406, transceiver interface 1414, processor 1410 and memory 1408. The memory is coupled to the processor 1410, I/O interface 1412 and transceiver interface 1414 via bus 1416 through which the elements of the computer system 1400 can exchange data and can communicate with other devices via the I/O interface 1412 and/or interface 1414 which can couple the system 1400 to a network and/or camera apparatus. It should be appreciated that via interface 1414 image data can be loaded on to the computer system 1400 and subject to processing, e.g., post capture processing. The images may be stored in the data/information portion 1420 of memory 1408 for processing. The assembly of modules 1418 includes one or more modules or routines which, when executed by the processor 1410, control the computer system to implement one or more of the image processing operations described in the present application. The output of multiple optical receiver chains can be, and in some embodiments is, combined to generate one or more images. The resulting images are stored in the data portion of the memory 1408 prior to being output via the network interface 1414, though another interface, or displayed on the display 1402. Thus, via the display 1402 a user can view image data corresponding to one or more individual optical chain modules as well as the result, e.g., image, generated by combining the images captured by one or optical chain modules.

Figures 6, 6A, 6B:
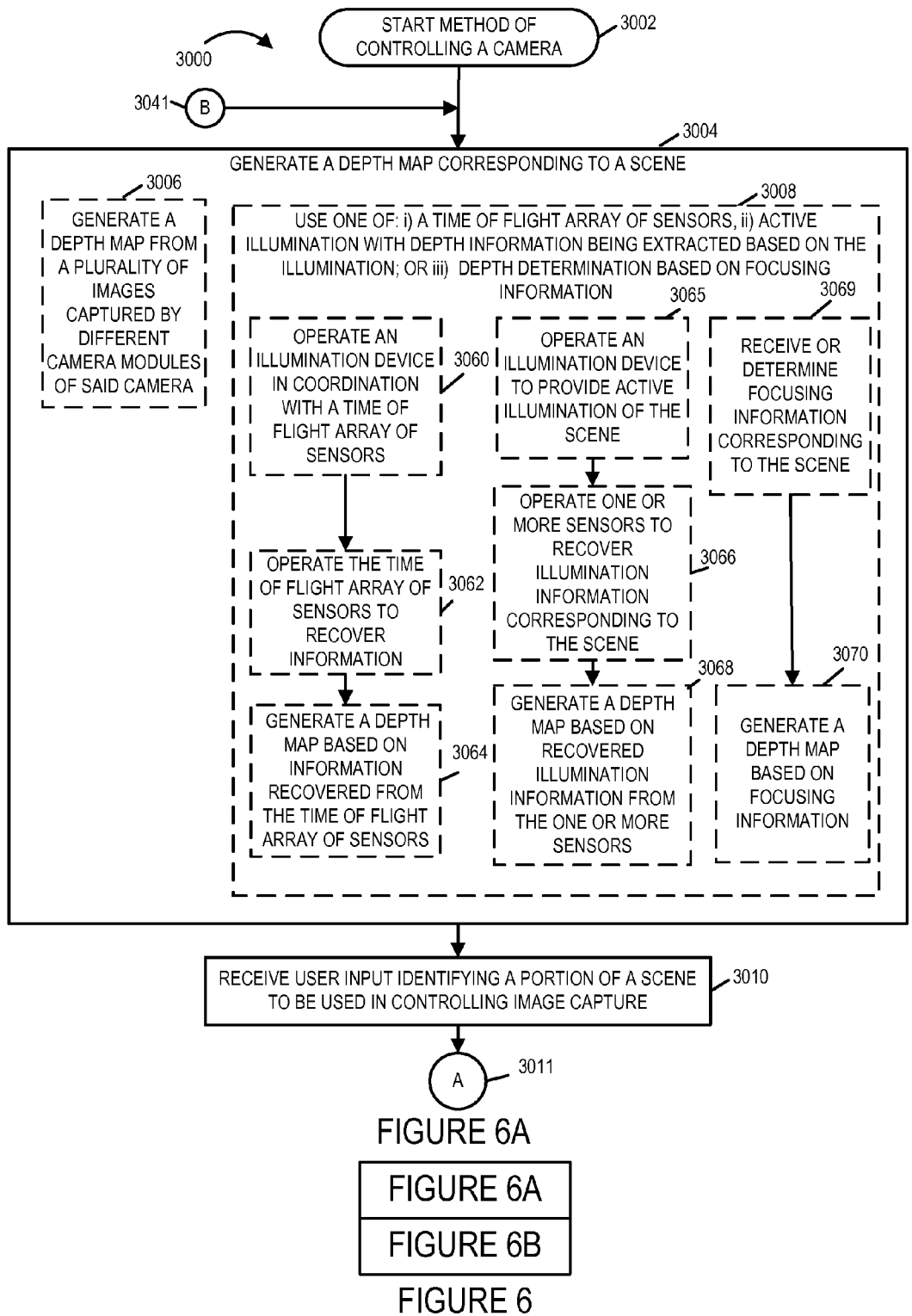
FIG. 6A is a first part of a flowchart of an exemplary method of controlling a camera in accordance with an exemplary embodiment.
FIG. 6B is a second part of a flowchart of an exemplary method of controlling a camera in accordance with an exemplary embodiment.
Figure 6B:
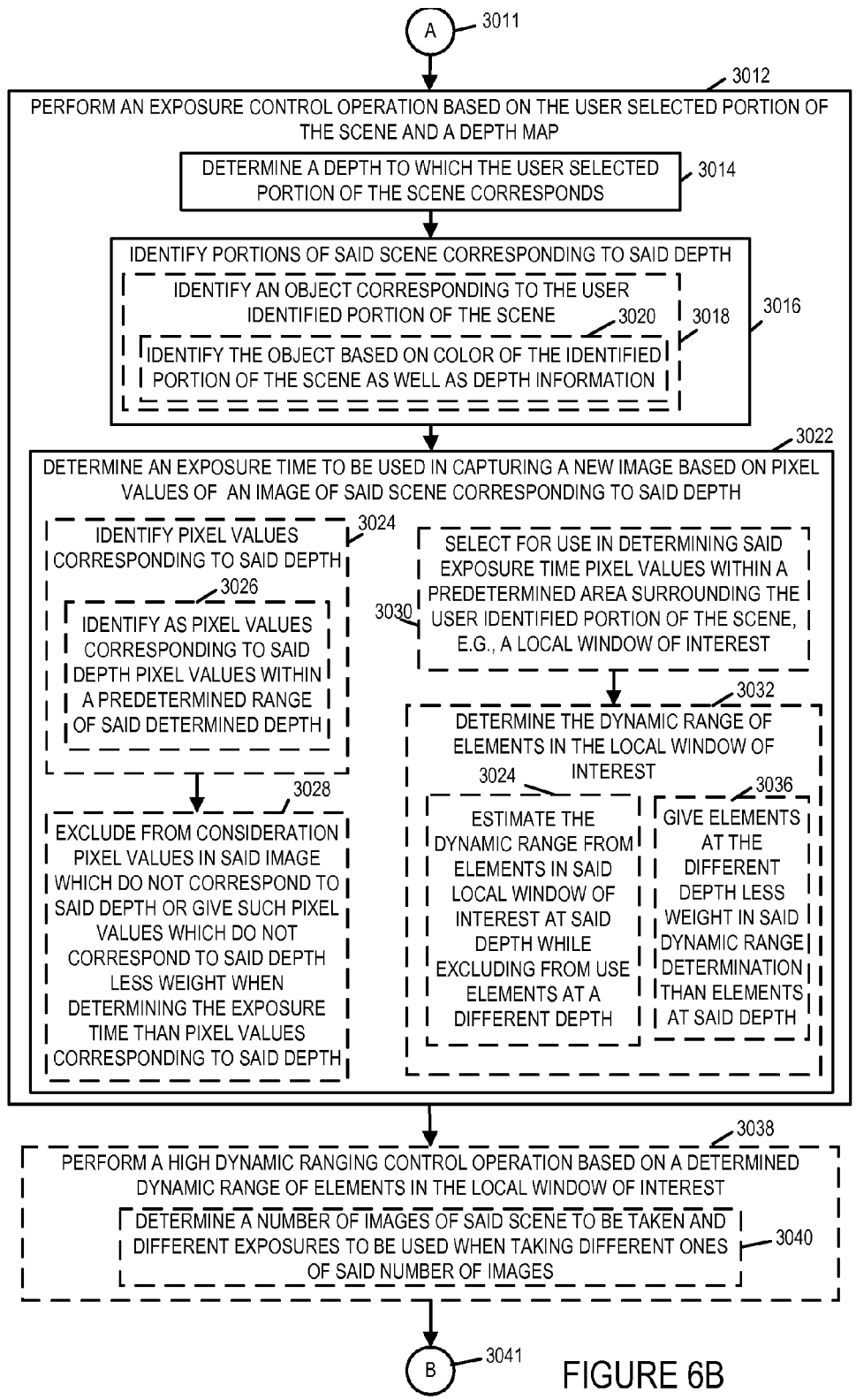

FIG. 6, comprising the combination of FIG. 6A and FIG. 6B, is a flowchart 3000 of an exemplary method of controlling a camera, e.g., camera device 100 of FIG. 1A, in accordance with various exemplary embodiments. Operation starts in step 3002 in which the camera is powered on and initialized and proceeds to step 3004.

In step 3004 the camera generates a depth map corresponding to a scene. In some embodiments step 3004 includes step 3006, in which the camera generates a depth map from a plurality of images captured by different camera modules, e.g., different optical chain modules, of said camera. In some embodiments, step 3004 includes step 3008 in which the camera uses one of: i) a time of flight array of sensors, ii) active illumination with depth information being extracted based on illumination; or iii) depth determination based on focusing information.

In some embodiments, step 3008 includes 3060, 3062 and 3064. In step 3060 the camera operates an illumination device, in coordination with a time of flight array of sensors.

In step 3062 the time of flight array of sensors are operated to recover information, and in step 3064 a depth map is generated based on the information recovered from the time of flight array of sensors.

In some embodiments, step 3008 includes steps 3065, 3066 and 3068. In step 3065 an illumination device is operated to provide active illumination to the scene. In step 3066 one or more sensors are operated to recover illumination information corresponding to the scene, and in step 3068 a depth map is generated based on recovered information from the one or more sensors.

In some embodiments, step 3008 includes step 3069 and 3070. In step 3069 the camera receives or determines focusing information corresponding to the scene. In step 3070 the camera generates a depth map based on the focusing information.

Operation proceeds from step 3004 to step 3010.

In step 3010 the camera receives user input identifying a portion of a scene to be used in controlling image capture. Operation proceeds from step 3010, via connecting node A 3011, to step 3012.

In step 3012 the camera performs an exposure control operation based on the user selected portion of the scene and a depth map. Step 3012 includes steps 3014, 3016 and 3022.

In step 3014 the camera determines a depth to which the user selected portion of the scene corresponds. Operation proceeds from step 3014 to step 3016. In step 3016, the camera device identifies portions of said scene corresponding to said depth. In some embodiments, step 3016 includes step 3018 in which the camera identifies an object corresponding to the user identified portion of the scene. In some embodiments, step 3018 includes step 3020, in which the camera identifies the object based on color of the identified portion of the scene as well as depth information. In some embodiments, a depth map is used to identify an object of interest, and then exposure control is based on a window that includes the object of interest. In some embodiments, color in combination with depth information is used to identify the object of interest. For example, the object of interest may be and sometimes is identified as an object of the same color as the portion identified by the user at the same depth. As should be appreciated the use of a depth map in combination with color can lead to reliable identification of an object of interest in many cases even where the object is an odd such as the shape of shirt. Consider for example the even if a red shirt of a person is identified by a user as being the object of interest, it may be possible to distinguish based on the combination of color and depth between the red shirt of interest and a red bus in the background at a different distance from the camera than the shirt. Similarly, the use of color may allow for easy distinguishing between a red shirt and a tree nearby at the same depth. Depending on the embodiment depth and/or color may be used to identify the subject of interest with the combination of color and depth being particularly useful for some scenarios. Operation proceeds from step 3016 to step 3022.

In step 3022 the camera determines an exposure time to be used in capturing a new image based on pixel values of an image of said scene corresponding to said depth. In some embodiments, step 3022 includes step 3024 and 3028, In step 3024 the camera identifies pixel values corresponding to said depth. In some embodiments, step 3024 includes step 3026 in which the camera identifies as pixel values corresponding to said depth, pixel values within a predetermined range of said determined depth. Operation proceeds from step 3024 to step 3028. In step 3028 the camera excludes from consideration pixel values in said image which do not correspond to said depth or gives such pixel values which do not correspond to said depth less weight when determining the exposure time than pixel values corresponding to said depth, In some embodiments, step 3022 includes steps 3030 and 3032. In step 3030 the camera selects for use in determining said exposure time pixel values within a predetermined area surrounding the user identified portion of the scene. In some embodiments, the predetermined area surrounding the user identified portion of the scene is a local window of interest. Operation proceeds from step 3030 to step 3032. In step 3032 the camera determines the dynamic range of elements in the local window of interest. In some embodiments, step 3032 includes step 3024 or step 3036. In step 3024 the camera estimates the dynamic range from elements in said local window of interest at said depth while excluding from use elements at a different depth. In step 3026 the camera gives elements at different depth less weight in said dynamic range determination than elements at said depth.

In some embodiments, operation proceeds from step 3012 to 3038, in which the camera performs a high dynamic ranging control operation based on a determined dynamic range of elements in the local window of interest. In some such embodiments, step 3038 includes step 3040 in which the camera determines a number of images of said scene to be taken and different exposures to be used when taking different ones of said number of images. Operation proceeds from step 3038, via connecting node B 3041, to step 3004.

Figures 7, 7A:
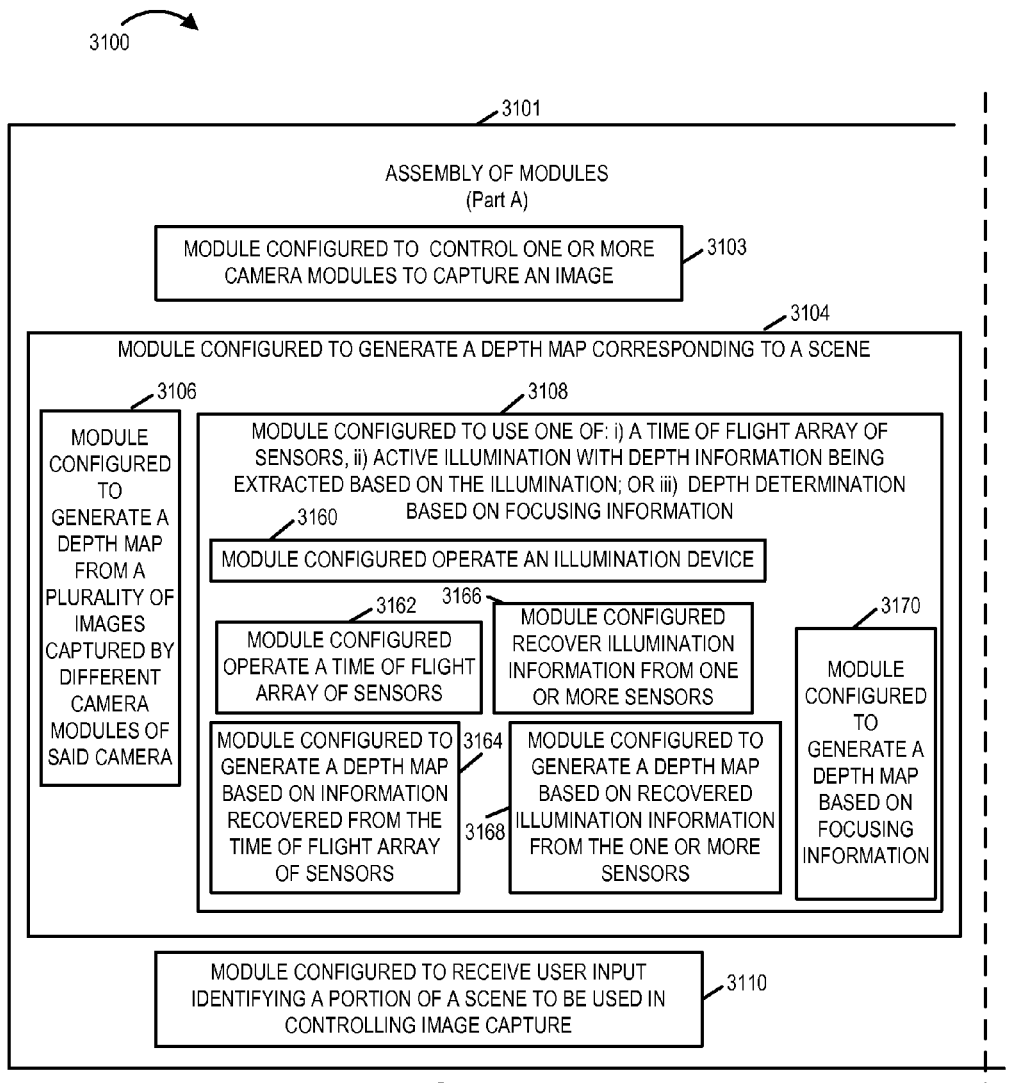
FIG. 7A is a first part of an assembly of modules, which may be included in a camera, in accordance with an exemplary embodiment.
Figure 7B:
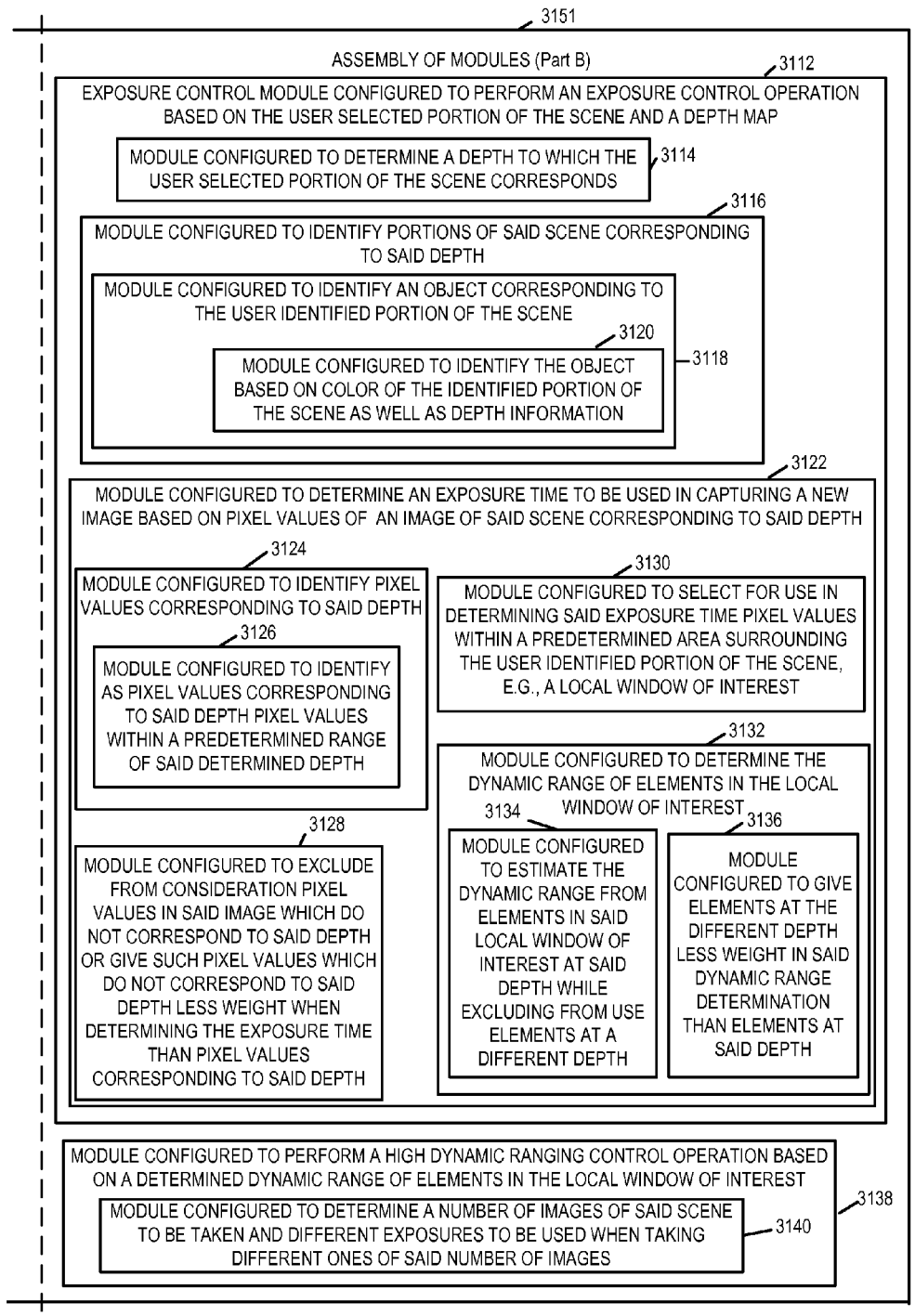
FIG. 7B is a first part of an assembly of modules, which may be included in a camera, in accordance with an exemplary embodiment.

FIG. 7, comprising the combination of FIG. 7A and FIG. 7B, is an assembly of modules 3100, comprising the combination of Part A 3101 and Part B 3151. Assembly of modules 3100 may be included in camera device 100 of FIG. 1A, e.g., as assembly of modules 118 or assembly of modules 119 or implemented within processor 110. In some embodiments, some modules of assembly of modules 3100 are includes in assembly of modules 118 and other modules of assembly of modules 3100 are included in assembly of modules 119. Thus assembly of modules may be implemented as hardware, software, or a combination of hardware and software.

Assembly of modules 3100 includes a module 3103 configured to control one or more camera modules, e.g., optical chains, to capture an image, a module 3104 configured to generate a depth map corresponding to a scene, and a module 3110 configured to receive user input identifying a portion of a scene to be used in controlling image capture. Module 3104 includes a module 3106 configured to generate a depth map from a plurality of images captured by different camera modules of said camera, e.g. different optical chain modules of said camera, and a module 3108 configured to use on of: a time of flight array of sensor, ii) active illumination with depth information being extracted based on the illumination; or iii) depth determination based on focusing information. Module 3108 includes a module 3160 configured to operate an illumination device, a module 3162 configured to operate a time of flight array of sensors, a module 3164 configured to generate a depth map based on information recovered from the time of flight array of sensors, a module 3166 configured to recover illumination information from one or more sensors, a module 3168 configured to generate a depth map based on recovered information from the one or more sensors, and a module 3170 configured to generate a depth map based on focusing information.

Assembly of modules 3100 further includes an exposure control module 3112 configured to perform an exposure control operation based on the user selected portion of the scene and a depth map, and a module 3138 configured to perform a high dynamic ranging control operation based on a determined dynamic range of elements in the local window of interest. Module 3112 includes a module 3114 configured to determine a depth to which the user selected portion of the scene corresponds, a module 3116 configured to identify portions of said scene corresponding to said depth map, and a module 3122 configured to determine an exposure time to be used in capturing a new image based on pixel values of an image of said scene corresponding to said depth.

Module 3116 includes a module 3118 configured to identify an object corresponding to the user identified portion of the scene. Module 3118 includes a module 3120 configured to identify the object based on color of the identified portion of the scene as well as depth information.

Module 3122 includes a module 3124 configured to identify pixel values corresponding to said depth. Module 3124 includes a module 3126 configured to identify as pixel values corresponding to said depth pixel values within a predetermined range of said determined depth. Module 3122 further includes a module 3128 configured to exclude from consideration pixel values in said image which do not correspond to said depth or give such pixel values which do not correspond to said depth less weight when determining the exposure time than pixel values corresponding to said depth.

Module 3122 further includes a module 3130 configured to select for use in determining said exposure time pixel values within a predetermined area surrounding the user identified portion of the scene, e.g., a local window of interest, and a module 3132 configured to determine the dynamic range of elements in the local window of interest. Module 3132 includes a module 3134 configured to estimate the dynamic range from elements in said local window of interest at said depth while excluding from use elements at a different depth, and a module 3136 configured to give elements at the different depth less weight in said dynamic range determination than elements at said depth.

Module 3138 includes a module 3140 configured to determine a number of images of said scene to be taken and different exposures to be used when taking different ones of said number of images.

Figure 8:
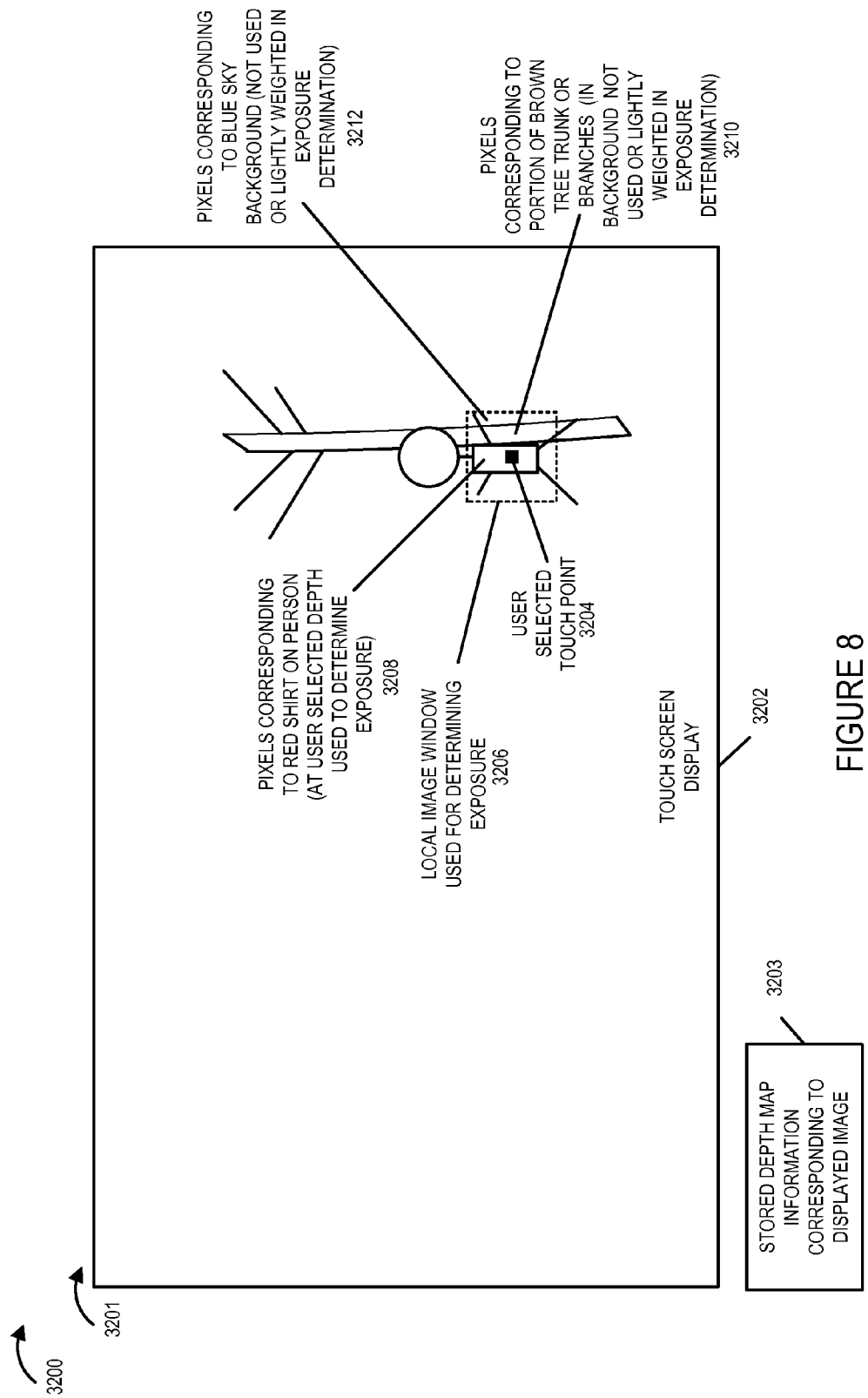
FIG. 8 is a drawing illustrating an example of exposure control in accordance with an exemplary embodiment.

FIG. 8 is a drawing 3200 illustrating an image 3201 on a touch screen display 3202 of a camera, e.g., camera 100 of FIG. 1A, and corresponding stored depth map information corresponding to the displayed image 3203, which may be included in data/information 120 memory 108 of the camera 100 and used in the exposure determination in accordance with an exemplary embodiment implementing a method in accordance with flowchart 3000 of FIG. 6. In this example, the user selected touch point is indicated by dark square 3204. Based on the user selected touch point, a local image window 3206 is determined, as indicated by dotted line box 3206. Based on the user selected touch point and the depth map information the depth value corresponding to the touch point is determined and used in the exposure determination. In this example, the user selected touch point 3204 corresponds to the location of the red shirt on the person. Pixels 3208 corresponding to the red shirt on the person are used to determine the exposure. Pixels 3210 corresponding to the portions of the brown tree trunk or branches in the background, within the local image window, are not used or are lightly weighted, in the exposure determination. Pixels 3212 corresponding to the blue sky in the very far background are not used or are lightly weighted in the exposure determination.

An exemplary method of controlling a camera, e.g., camera device 100 of FIG. 1A, in accordance with various embodiments, comprises: receiving user input identifying a portion of a scene to be used in controlling image capture; and performing an exposure control operation based on the user selected portion of the scene and a depth map. In some such embodiments, the method further comprises: prior to performing the exposure control operation, generating a depth map corresponding to a scene.

In various embodiments, generating a depth map includes generating the depth map from a plurality of images captured by different camera modules of said camera. In some embodiments, generating a depth map includes using one of: i) a time of flight array of sensors, ii) active illumination with depth information being extracted based on the illumination, or iii) depth determination based on focusing information.

In some embodiments, performing an exposure control operation based on the user selected portion of the scene and said depth map includes: determining a depth to which the user selected portion of the scene corresponds; and identifying portions of said scene corresponding to said depth; and determining an exposure time to be used in capturing a new image based on pixel values of an image of said scene corresponding to said depth. In some such embodiments, identifying portions of said scene corresponding to said depth include identifying an object corresponding to the user identified portion of the scene. In some such embodiments, identifying the object is based on color of the identified portion of said scene as well as said depth.

In various embodiments, determining an exposure time to be used in capturing an image based on pixel values of the image of said scene corresponding to said depth includes: excluding from consideration pixel values in said image which do not correspond to said depth or giving such pixel values which do not correspond to said depth less weight when determining the exposure time than pixel values corresponding to said depth. In some such embodiments, the method further includes, prior to excluding from consideration pixel values in said image which do not correspond to said depth or giving such pixel values which do not correspond to said depth less weight when determining the exposure time than pixel values corresponding to said depth identifying pixel values corresponding to said depth, said identifying pixel values corresponding to said depth including: identifying as pixel values corresponding to said depth pixel values within a predetermined range of said determined depth.

In some embodiments, determining an exposure time includes: selecting for use in determining said exposure time pixel values within a predetermined area surrounding the user identified portion of the scene. In some such embodiments, said predetermined area surrounding the user identified portion of the scene is a local window of interest.

In some embodiments, determining an exposure time includes: determining the dynamic range of elements in the local window of interest. In some such embodiments, the method further comprises: performing a high dynamic ranging control operation based on a determined dynamic range of elements in the local window of interest. In some embodiments, determining the dynamic range of elements in the local window of interest includes estimating the dynamic range from elements in said local window of interest at said depth while excluding from use in said step of determining the dynamic range elements at a different depth. In some embodiments determining the dynamic range of elements in the local window of interest includes giving elements at the different depth less weight in said dynamic range determination than elements at said depth.

In various embodiments, performing a high dynamic ranging control operation includes determining a number of images of said scene to be taken and different exposures to be used when taking different ones of said number of images.

An exemplary camera device, e.g., camera device 100 of FIG. 1A, in accordance with some embodiments, includes: a touch sensitive screen, e.g., display 102, for receiving user input identifying a portion of a scene to be used in controlling image capture; and an exposure control module, e.g., module 3112 of assembly of modules 3100 included as part of assembly of modules 119 or assembly of modules 118, for performing an exposure control operation based on the user selected portion of the scene and a depth map.

An exemplary camera device, e.g., camera device 100 of FIG. 1A, in accordance with various embodiments, comprises: means for receiving user input identifying a portion of a scene to be used in controlling image capture; and means for performing an exposure control operation based on the user selected portion of the scene and a depth map.

An exemplary camera device, e.g., camera device 100 of FIG. 1A, in accordance with various embodiments, comprises: a user input, e.g., input device 106 and/or display 102, e.g., a touch screen, for receiving user input identifying a portion of a scene to be used in controlling image capture; and a processor, e.g., processor 110, configured to perform an exposure control operation based on the user selected portion of the scene and a depth map. In some such embodiments, the processor is further configured to generate a depth map corresponding to a scene prior to performing the exposure control operation. In some embodiments, the processor is configured to generate the depth map from a plurality of images captured by different camera modules of said camera, as part of being configured to generate a depth map. In some embodiments, the processor is configured to use one of: i) a time of flight array of sensors, ii) active illumination with depth information being extracted based on the illumination, or iii) depth determination based on focusing information, as part of being configured to generate a depth map.

In some embodiments, the processor is configured to: determine a depth to which the user selected portion of the scene corresponds; identify portions of said scene corresponding to said depth; and determine an exposure time to be used in capturing a new image based on pixel values of an image of said scene corresponding to said depth, as part of being configured to perform an exposure control operation based on the user selected portion of the scene and said depth map. In some such embodiments, the processor is configured to identify an object corresponding to the user identified portion of the scene, as part of being configured to identify portions of said scene corresponding to said depth. In some such embodiments, the processor is configured to identify the object based on color of the identified portion of said scene as well as said depth.

In various embodiments, the processor is configured to exclude from consideration pixel values in said image which do not correspond to said depth or giving such pixel values which do not correspond to said depth less weight when determining the exposure time than pixel values corresponding to said depth, as part of being configured to determine an exposure time to be used in capturing an image based on pixel values of the image of said scene corresponding to said depth. In some such embodiments, the processor is configured to identify as pixel values corresponding to said depth pixel values within a predetermined range of said determined depth, as part of being configured to identify pixel values corresponding to said depth. In some such embodiments, the processor is configured to identify as pixel values corresponding to said depth pixel values within a predetermined range of said determined depth prior to excluding from consideration pixel values in said image which do not correspond to said depth or giving such pixel values which do not correspond to said depth less weight when determining the exposure time than pixel values corresponding to said depth identifying pixel values corresponding to said depth.

In various embodiments, the processor is configured to select for use in determining said exposure time pixel values within a predetermined area surrounding the user identified portion of the scene, as part of being configured to determine an exposure time. In some such embodiments, the predetermined area surrounding the user identified portion of the scene is a local window of interest.

In some embodiments, the processor is configured to determine the dynamic range of elements in the local window of interest, as part of being configured to determine an exposure time. In some such embodiments, the processor is configured to perform a high dynamic ranging control operation based on a determined dynamic range of elements in the local window of interest. In some embodiments, the processor is further configured to estimate the dynamic range from elements in said local window of interest at said depth while excluding from use in said step of determining the dynamic range elements at a different depth, as part of being configured to determine the dynamic range of elements in the local window of interest.

In some embodiments, the processor is configured to give elements at the different depth less weight in said dynamic range determination than elements at said depth, as part of being configured to determine the dynamic range of elements in the local window of interest. In some embodiments, the processor is configured to determine a number of images of said scene to be taken and different exposures to be used when taking different ones of said number of images, as part of being configured to perform a high dynamic ranging control operation.

An exemplary non-transitory computer readable medium, in accordance with some embodiments, comprises processor executable instructions which, when executed by a processor of a camera device control the camera device to: detect receipt of user input identifying a portion of a scene to be used in controlling image capture; and automatically control the camera device to perform an exposure control operation based on the user selected portion of the scene and a depth map.

The techniques of various embodiments may be implemented using software, hardware and/or a combination of software and hardware. Various embodiments are directed to apparatus, e.g., a camera device, an image processing device or a system. Various embodiments are also directed to methods, e.g., a method of generating combined pixel values from sets of input pixel values corresponding to an image area where each set of pixel values may be provided by a different optical chain module. Various embodiments are also directed to machine, e.g., computer, readable medium, e.g., ROM, RAM, CDs, hard discs, etc., which include machine readable instructions for controlling a machine, e.g., camera device, processor or image processing system, to implement one or more steps of one or more of the methods described in the present application.

In various embodiments apparatus described herein are implemented using one or more modules to perform the steps corresponding to one or more methods. Thus, in some embodiments various features are implemented using modules. Such modules may be implemented using software, hardware or a combination of software and hardware. Optical chain modules as should be appreciated include as least some hardware elements such as an image sensor and are therefore normally not implementable purely in software while other modules may be implemented fully in software. In some embodiments in which the modules are implemented in hardware, the modules are implemented as circuits, e.g., of a processor and/or as a combination of hardware elements such as lenses, filters and an image sensor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a camera device, an image processing device or other type of system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed:

1. A method of controlling a camera, the method comprising:
receiving user input identifying a portion of a scene to be used in controlling image capture;
determining a depth to which the user identified portion of the scene corresponds; and
performing an exposure control operation based on the user selected portion of the scene and a depth map, said step of performing an exposure control operation including:
determining an exposure time to be used in capturing a new image based on pixel values of a first image of said scene corresponding to said depth to which the user identified portion of the scene corresponds while excluding from consideration pixel values in said first image which do not correspond to said depth or giving pixel values in said first image which do not correspond to said depth less weight when determining the exposure time than pixel values in said first image corresponding to said depth.

2. The method of claim 1, further comprising:
prior to performing the exposure control operation, generating the depth map, said depth map corresponding to the scene.

3. The method of claim 2, wherein generating the depth map includes generating the depth map from a plurality of images captured by different camera modules of said camera.

4. The method of claim 2, wherein generating the depth map includes using one of: i) a time of flight array of sensors, ii) active illumination with depth information being extracted based on the illumination, or iii) depth determination based on focusing information.

5. The method of claim 1, wherein performing an exposure control operation based on the user selected portion of the scene and said depth map includes:
identifying portions of said first image of said scene corresponding to said depth.

6. The method of claim 5, wherein identifying portions of said first image of said scene corresponding to said depth includes identifying an object corresponding to the user identified portion of the scene.

7. The method of claim 6, wherein identifying the object is based on color of the user identified portion of said scene as well as said depth.

8. The method of claim 1, wherein said camera includes a plurality of optical chains.

9. The method of claim 1, further comprising:
prior to excluding from consideration pixel values in said first image which do not correspond to said depth or giving such pixel values in said first image which do not correspond to said depth less weight when determining the exposure time than pixel values in said first image corresponding to said depth, identifying pixel values in said first image corresponding to said depth, said identifying pixel values in said first image corresponding to said depth including:
identifying as pixel values in said first image corresponding to said depth pixel values in said first image within a predetermined range of said determined depth.

10. The method of claim 9, wherein determining an exposure time includes:
selecting for use in determining said exposure time pixel values in said first image within a predetermined area surrounding the user identified portion of the scene.

11. The method of claim 10, wherein said predetermined area surrounding the user identified portion of the scene is a local window of interest.

12. The method of claim 11, wherein determining an exposure time includes:
determining the dynamic range of elements in the local window of interest.

13. The method of claim 12, further comprising:
performing a high dynamic ranging control operation based on a determined dynamic range of elements in the local window of interest.

14. The method of claim 12, wherein determining the dynamic range of elements in the local window of interest includes estimating the dynamic range from elements in said local window of interest at said depth while excluding from use in said step of determining the dynamic range elements at a different depth.

15. The method of claim 13, wherein performing a high dynamic ranging control operation includes determining a number of images of said scene to be taken and different exposures to be used when taking different ones of said number of images.

16. The method of claim 12, wherein determining the dynamic range of elements in the local window of interest includes giving elements at the different depth less weight in said dynamic range determination than elements at said depth.

17. A camera device, comprising:
a touch sensitive screen for receiving user input identifying a portion of a scene to be used in controlling image capture; and
an exposure control module for performing an exposure control operation based on the user selected portion of the scene and a depth map, wherein performing an exposure control operation includes:
determining a depth to which the user identified portion of the scene corresponds; and
determining an exposure time to be used in capturing a new image based on pixel values of a first image of said scene corresponding to said depth to which the user identified portion of the scene corresponds while excluding from consideration pixel values in said first image which do not correspond to said depth or giving pixel values in said first image which do not correspond to said depth less weight when determining the exposure time than pixel values in said first image corresponding to said depth.

18. A camera device, comprising:
a user input for receiving user input identifying a portion of a scene to be used in controlling image capture; and
a processor configured to:
determine a depth to which the user identified portion of the scene corresponds; and
perform an exposure control operation based on the user selected portion of the scene and a depth map, performing an exposure control operation including determining an exposure time to be used in capturing a new image based on pixel values of a first image of said scene corresponding to said depth to which the user identified portion of the scene corresponds while excluding from consideration pixel values in said first image which do not correspond to said depth or giving pixel values in said first image which do not correspond to said depth less weight when determining the exposure time than pixel values in said first image corresponding to said depth.

19. The camera device of claim 18, wherein said processor is further configured to generate a depth map corresponding to a scene.

20. The camera device of claim 19, wherein said processor is further configured to:
identify portions of said first image of said scene corresponding to said depth.

* * * * *